United States Patent [19]
Holtey et al.

[11] Patent Number: 4,458,308
[45] Date of Patent: Jul. 3, 1984

[54] MICROPROCESSOR CONTROLLED COMMUNICATIONS CONTROLLER HAVING A STRETCHED CLOCK CYCLE

[75] Inventors: Thomas O. Holtey, Newton, Mass.; Richard P. Kelly, Nashau, N.H.; Steven S. Noyes, Boylston, Mass.; Daniel G. Peters, Billerica, Mass.

[73] Assignee: Honeywell Information Systems Inc., Waltham, Mass.

[21] Appl. No.: 194,540

[22] Filed: Oct. 6, 1980

[51] Int. Cl.$^3$ .......................... G06F 3/04; G06F 5/06
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,418,498 | 12/1968 | Farley | 307/293 |
| 3,543,295 | 11/1970 | Overstreet, Jr. | 328/38 |
| 3,593,158 | 7/1971 | Day et al. | 328/55 |
| 3,594,733 | 7/1971 | Lukens | 364/200 |
| 3,775,696 | 11/1973 | Garth | 331/57 |
| 4,040,021 | 8/1977 | Birchall et al. | 364/200 |
| 4,050,096 | 9/1977 | Bennett et al. | 364/200 |
| 4,105,978 | 8/1978 | Goss | 328/58 |
| 4,110,564 | 8/1978 | Andresen | 364/900 |
| 4,134,073 | 1/1979 | MacGregor | 328/63 |
| 4,143,418 | 3/1979 | Hodge et al. | 364/200 |
| 4,153,941 | 5/1979 | Caddell | 364/900 |
| 4,156,907 | 5/1979 | Rawlings et al. | 364/200 |
| 4,156,932 | 5/1979 | Robinson et al. | 364/200 |
| 4,200,930 | 4/1980 | Rawlings et al. | 364/200 |
| 4,236,213 | 11/1980 | Richardson | 364/900 |
| 4,241,418 | 12/1980 | Stanley | 364/900 |
| 4,263,650 | 4/1981 | Bennett et al. | 364/200 |
| 4,291,371 | 9/1981 | Holtey | 364/200 |

Primary Examiner—Jerry Smith
Assistant Examiner—Gary V. Harkcom
Attorney, Agent, or Firm—Nicholas Prasinos

[57] ABSTRACT

A communications controller of a data processing system uses a microprocessor to control communication operations. Apparatus in the controller stretches the microprocessor clock cycle signals for selected operations to allow the microprocessor speed to match the speed of the logic performing the selected operation. The apparatus includes a counter which is freerunning for the stretched cycle and reset on a predetermined cycle for the "no stretch" cycle. A decoder coupled to the counter conditions logic gates to generate the microprocessor clock cycle signals.

4 Claims, 4 Drawing Figures

- - - CONTROL

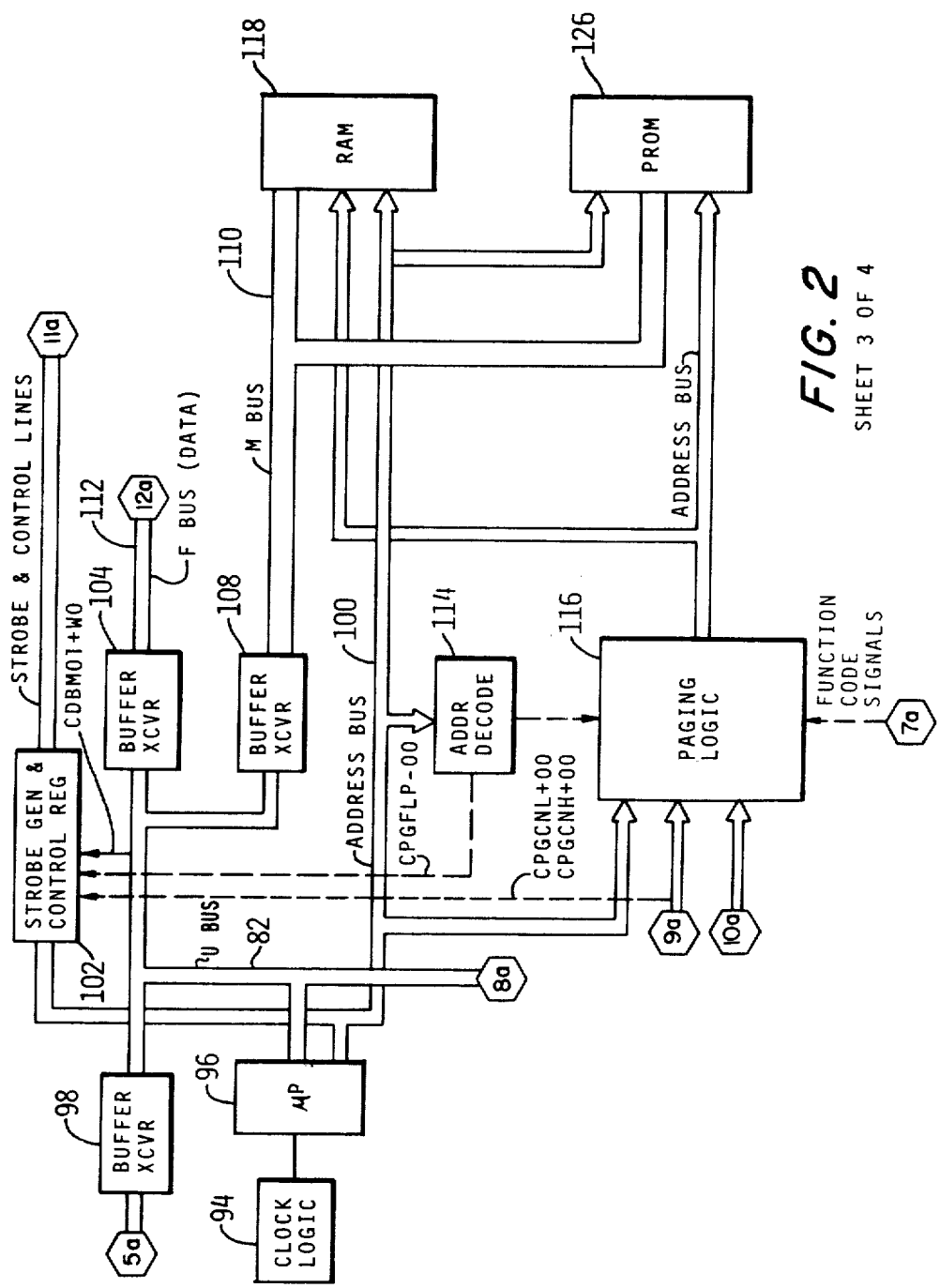
FIG. 2 SHEET 3 OF 4

MICROPROCESSOR CONTROLLED COMMUNICATIONS CONTROLLER HAVING A STRETCHED CLOCK CYCLE

BACKGROUND OF THE INVENTION

1. Field of the Invention

This invention relates to a microprocessor controlled communications controller and more particularly to the stretching of the microprocessor clock cycle signals.

2. Description of the Prior Art

Communications controllers are used in the communications field to accommodate the transfer of information between a communication transmission line and a data processing system.

The communications controller includes a microprocessor for controlling the communications controller, a random access memory for storing microprocessor program instructions, universal synchronous receiver transmitters (USRTs) for controlling the flow of data between the communication lines, and the communications controller. U.S. Pat. No. 4,291,371 which issued Sept. 22, 1981 entitled, "I/O Request Interrupt Mechanism" describes such a communications controller.

However, additional requirements were placed on such systems. Additional communication lines were coupled to such a system. Different kinds of communication devices were added such as Automatic Dialing units, Touch Tone Receivers, higher performance MODEMs, CRT terminals, etc. As a result, higher speed microprocessors and random access memories replaced their slower speed counterparts. The logic of the controller was also rearranged to provide common logic on a printed circuit board and individual logic associated with each device on separate smaller printed circuit boards.

This presented the problem of determining the speed at which the microprocessor would operate. The microprocessor could operate with memory at high speed but was limited to a slower speed when operating with the USRTs or the smaller printed circuit board. The operating speed of the prior art systems was limited to the speed of the slowest logic unit that was operative with the microprocessor. A solution was to have the microprocessor operate at high speed with faster logic units and at lower speed with the slower logic units.

U.S. Pat. No. 4,050,096 entitled, "Pulse Expanding System for Microprocessor Systems with Slow Memory" describes a clocking system whereby the length of a clocking pulse expanded to be operative with memory locations having longer access time. This approach, however, does provide the two clock rates needed to be operative with fast and slow logic speeds.

U.S. Pat. No. 4,040,021 entitled, "Circuit for Increasing the Apparent Occupancy of a Processor" describes a system which includes provisions for executing flagged instructions with standard machine timing and for executing unflagged instructions with extended machine timing. This requires two clock signal lines with the ability to suppress periodic timing pulses on one of the signal lines.

A number of other U.S. patents describe the modification of clocking pulses; however, they all have the disadvantage of using delay lines with their inherent higher cost. These include: U.S. Pat. No. 4,105,978 entitled, "Stretch and Stall Clock"; U.S. Pat. No. 3,594,733 entitled, "Digital Pulse Stretcher"; U.S. Pat. No. 3,543,295 entitled, "Circuits for Changing Pulse Train Repetition Rates"; U.S. Pat. No. 3,418,498 entitled, "Delay Line Timing Circuit for Use with Computer or Other Timed Operation Devices"; U.S. Pat. No. 3,593,158 entitled, "Variable Frequency Pulse Generator"; U.S. Pat. No. 3,775,696 entitled, "Synchronous Digital System Having A Multispeed Logic Clock Oscillator"; and U.S. Pat. No. 4,134,073 entitled, "Clock System Having Adaptive Synchronization Feature".

OBJECTS OF THE INVENTION

Accordingly, it is an object of the invention to have an improved communications controller.

Another object is to have a communications controller with improved throughput.

Still another object is to have a communications controller with an improved clocking apparatus.

Yet another object is to have a lower cost clocking system having increased capability.

SUMMARY OF THE INVENTION

A communications controller includes a microprocessor, a random access memory (RAM), universal synchronous receiver transmitters (USRTs), and a number of Flexible Line Adapter Packages (FLAPs). The microprocessor is operative with a RAM at a 500 nanosecond clock rate and is operative with the USRTs and the FLAPs at a 1600 nanosecond clock rate.

The clocking logic normally generates 500 nanosecond clock rate signals. However, the clocking logic is responsive to control signals indicating that the microprocessor is operative with a USRT or a FLAP to generate the 1600 nanosecond clock rate signals.

A 100 nanosecond freerunning clock signal advances a binary counter. A decoder receives the binary counter output signals and generates phased clock signals which are applied to logic gates to generate the microprocessor phase 1 and phase 2 timing signals. The counter is reset every fifth freerunning clock signal thereby generating the 500 nanosecond clock rate.

The control signals that indicate that a USRT or a FLAP is operative suppresses the counter reset signal. This enables the counter to be freerunning, resulting in a 1600 nanosecond clock rate.

DESCRIPTION OF THE PREFERRED EMBODIMENT

Figure 1:
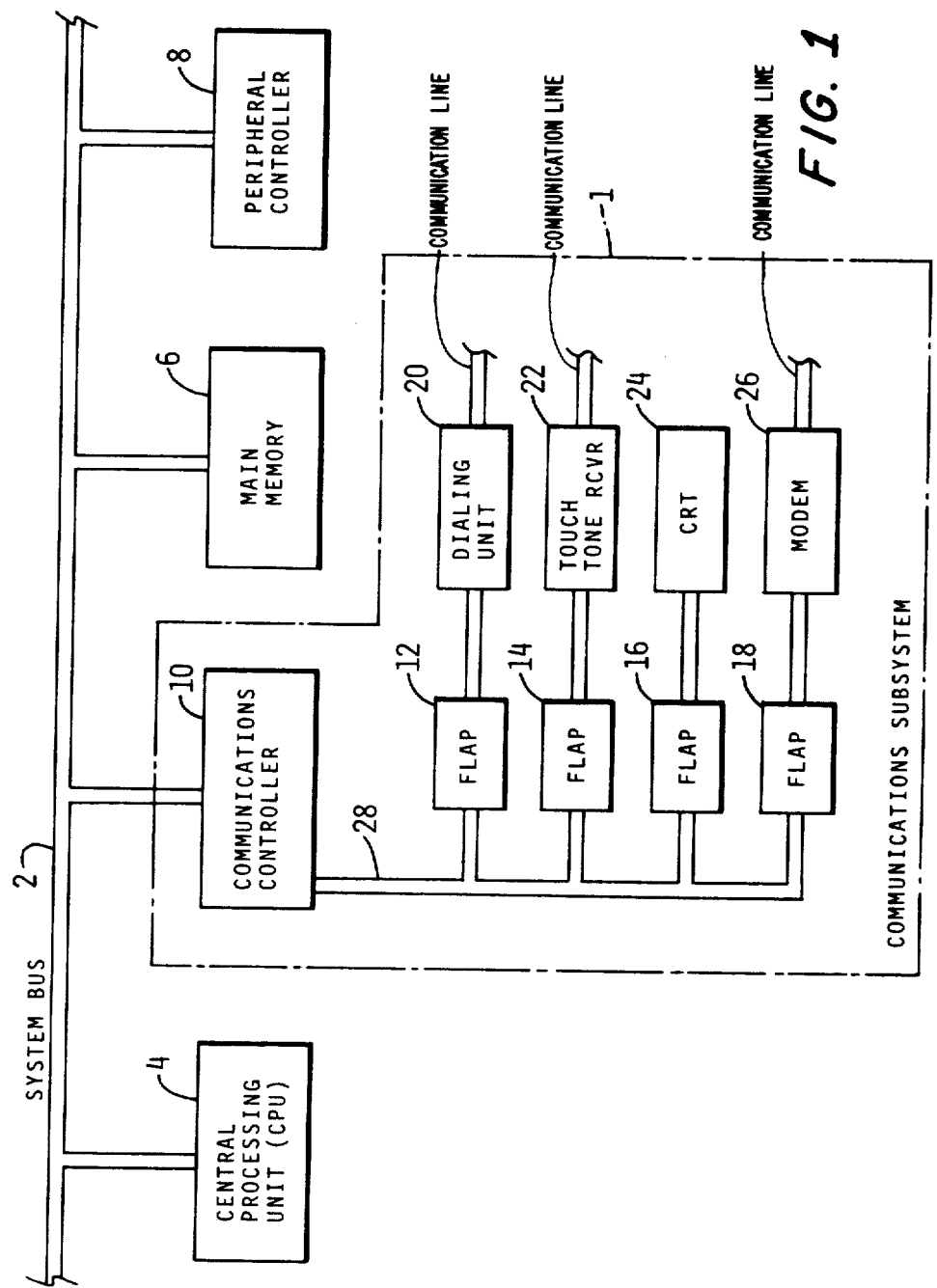
FIG. 1 is a data processing system including a communications subsystem.

FIG. 1 is a block diagram of a typical system. It includes a central processor unit (CPU) 4, a main memory 6, a peripheral controller 8, and a communications controller 10, all coupled in common to a system bus 2. The communications subsystem 1 includes the communications controller 10 and a number of units coupled to the communications controller 10 by a bus 28. This includes a number of flexible line adapter packages (FLAPs) 12, 14, 16 and 18. Coupled to FLAP 12 typically could be a dialing unit 20. Coupled to FLAP 14 typically could be a touch-tone receiver 22. Coupled to FLAP 16 typically could be a cathode ray tube (CRT) display 24. Coupled to FLAP 18 typically could be a modem 26.

The communications subsystem 1 receives information from devices, typically the touch-tone receiver 22 and the modem 26, through FLAPs 14 and 18 respectively. The information is transferred over bus 28 to communications controller 10. The information is stored via system bus 2 in main memory 6.

The communications subsystem 1 sends information to devices, typically the dialing unit 20, the CRT 24 and the modem 26. The information is sent to FLAPs 12, 16 and 18 from main memory 6 via communications controller 10 and system bus 2.

The CPU 4 has overall control of the communications subsystem 1 execution and performance. The CPU 4 accomplishes this by transferring configuration and control information via system bus 2 for storage in the communications controller 10. This information includes channel control programs (CCP), communication control blocks (CCB), and line control tables (LCT). The CCP, CCB and LCT operations are described typically in U.S. Pat. No. 4,133,030 entitled "Control System Providing for the Transfer of Data in a Communications Processing System Employing Channel Dedicated Control Blocks".

Figure 2:
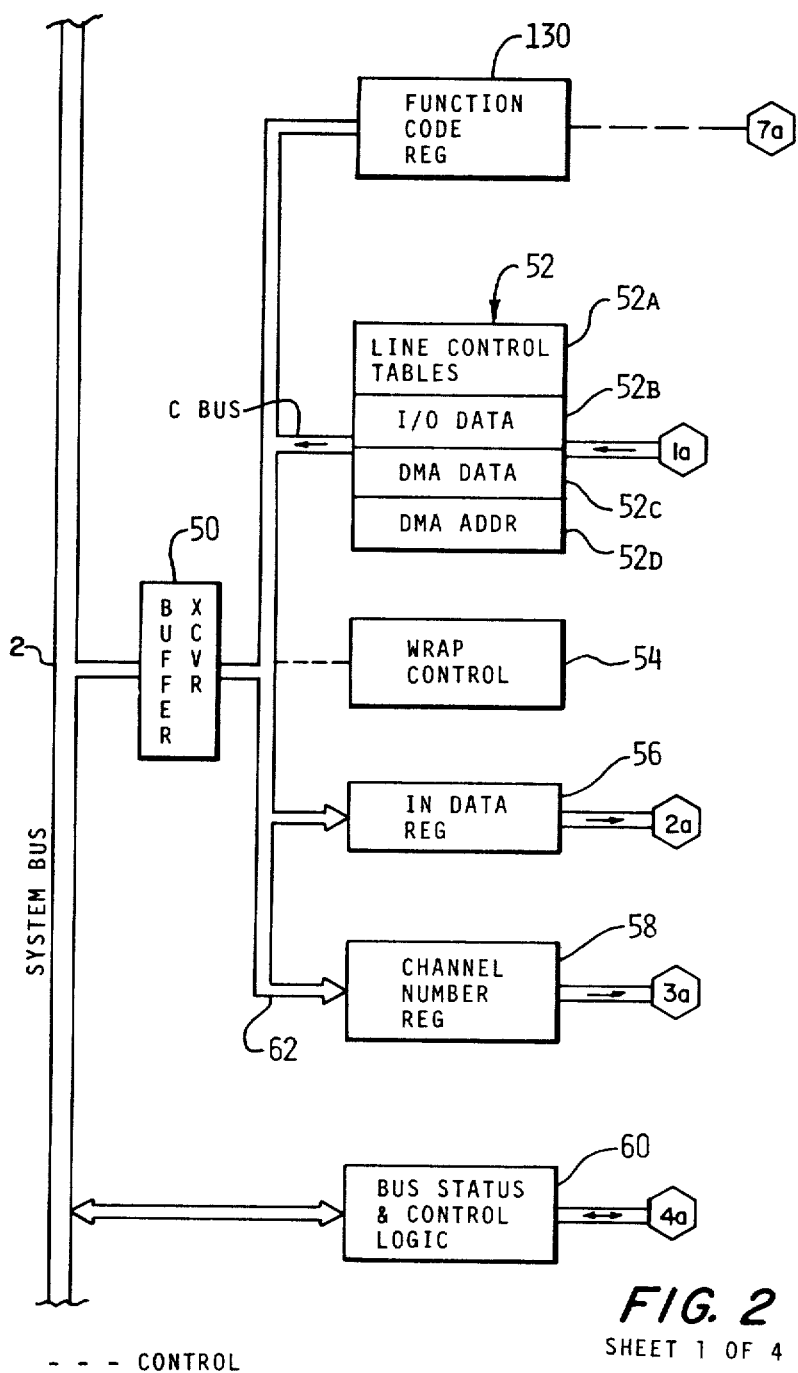
FIG. 2 is a composite of four drawings showing the communications subsystem.
Figure 2:
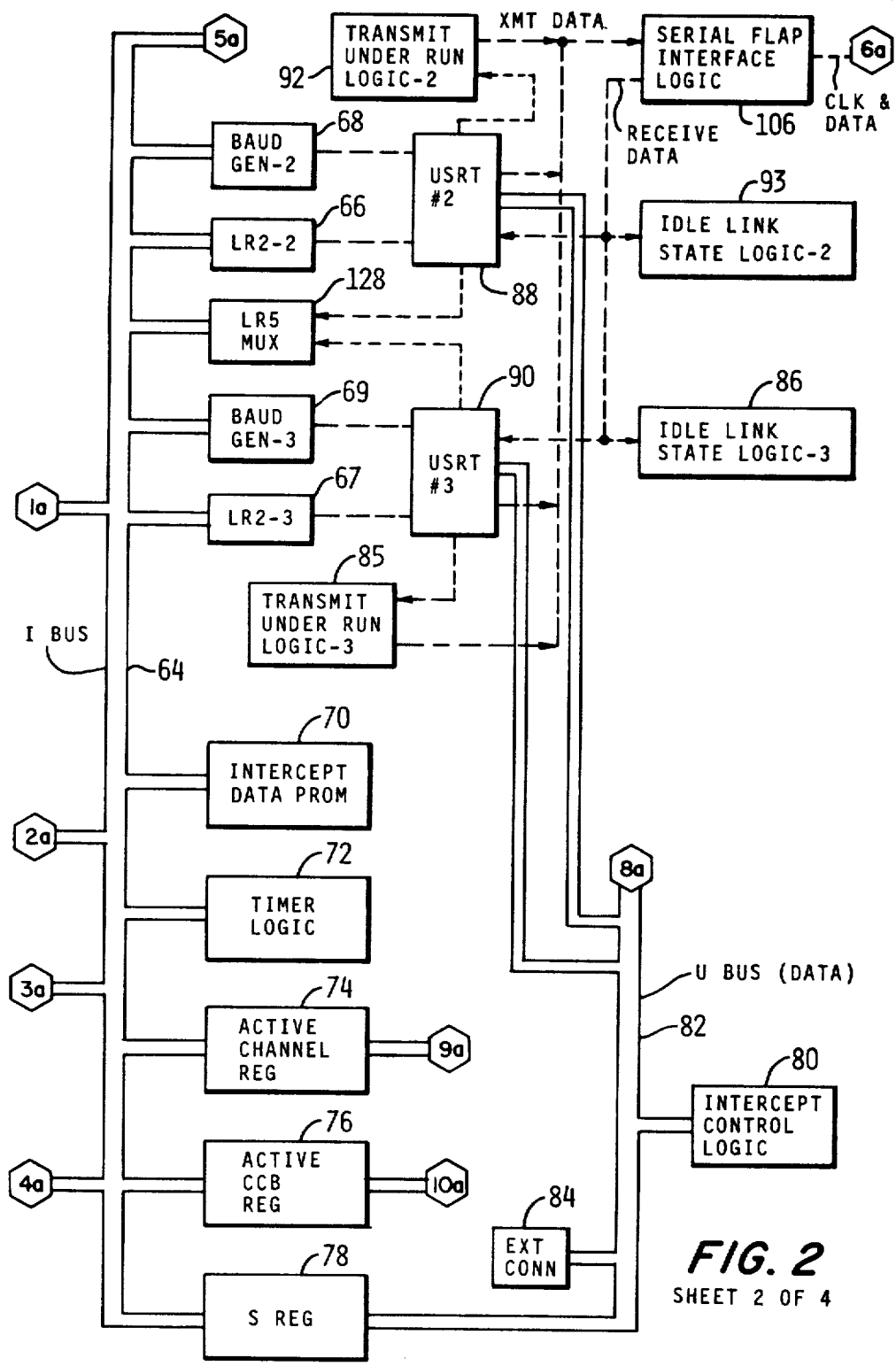
Figure 2:
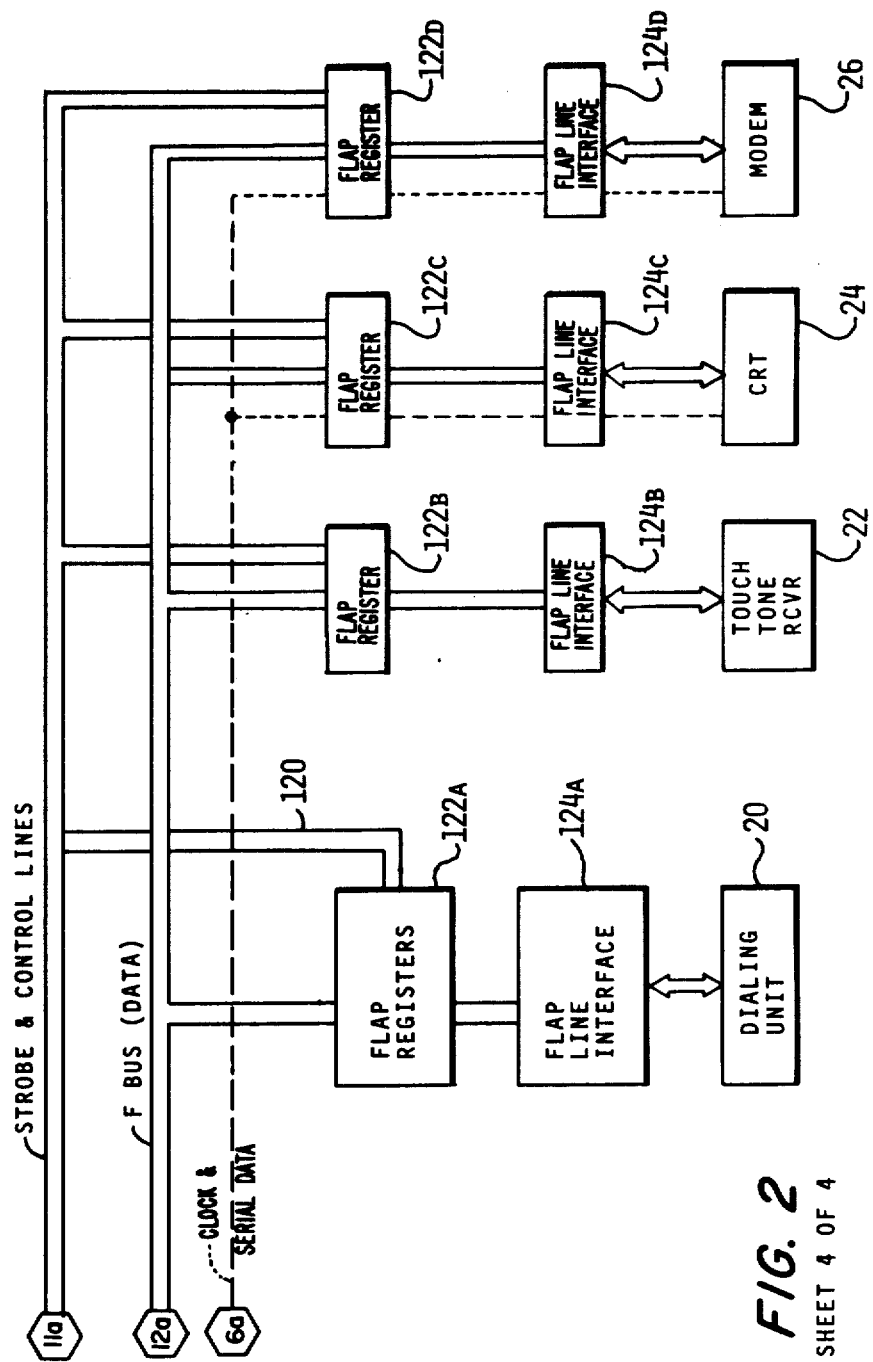

FIG. 2 shows a block diagram of the communications subsystem 1 including the communications controller 10 and the FLAPs 12, 14, 16 and 18. Information is received by communications controller 10 from main memory 6 via system bus 2, a transceiver 50, C bus 62, and is stored in an in data register 56 under control of bus and status logic 60. Bus and status logic 60 is described in U.S. Pat. No. 4,293,908 which issued Oct. 6, 1981 entitled, "Data Processing System Having Direct Memory Access Bus Cycle". Information is transferred to the system bus 2 via a random access memory (RAM) 52, C bus 62 and transceiver 50.

Information may be routed from RAM 52 to in data register 56 since transceiver 50 is capable of isolating the C bus 62 from system bus 2 during a wrap-around operation. RAM 52 contains four 16 bit registers, an interrupt data register 52a, an input/output data register 52b, a direct memory access (DMA) register 52c and a DMA address register 52d.

The interrupt data register 52a stores the channel number of the CPU 4 and the interrupt level of the information received by the communications subsystem 1 for transfer to main memory 6.

The CPU 4 channel number on system bus 2 indicates that this system bus 2 cycle contains information for the CPU 4.

The input/output data register 52b stores information, status or device identification, in response to a CPU 4 input request. The DMA data register 52c stores the information that is to be written into main memory 6.

The DMA address register 52d stores the main memory 6 address location into which the information stored in DMA data register 52c is to be written. The DMA address register 52d may also store the main memory 6 address location of the information requested by communications controller 10.

A channel number register 58 receives the channel number of all system bus 2 input/output cycles. The bus status and control logic 60 compares the channel number stored in manual switches with the channel number present on the system bus 2. An equal comparison indicates that this system bus 2 cycle is addressing communications subsystem 1. The channel number register 58 is then used to store the channel number present on the system bus 2. A function code register 130 stores the function code received from the system bus 2. The function code indicates to the communications subsystem 1 the input/output function the communications controller 10 is to perform.

A microprocessor 96 controls the operation of the communications controller 10. The microprocessor 96 communicates with the system bus 2 via a U bus 82, a transceiver 98, I bus 64, RAM 52 for sending data to the system bus 2; and in data register 56 for receiving data from the system bus 2, and transceiver 50. Microprocessor 96 generates address signals which are sent over an address bus 100.

Also coupled to U bus 82 are universal synchronous receive/transmit receivers USRT-2 88 and USRT-3 90 communication interfaces. Associated with USRT-2 88 is a baud rate generator BAUD-2 68 and an LR2-2 register 66. Associated with USRT-3 90 is a baud rate generator BAUD-3 69 and an LR2-3 register 67. BAUD-2 68 and BAUD-3 69 receive signals from I bus 64 to specify the baud rate for the devices directly connected to communications subsystem 1, and also indicates to USRT-2 88 and USRT-3 90 respectively, the baud rate for transmission to an external device. USRT-2 88 and USRT-3 90 are described in "Signetics Multi-Protocol Communications Circuit (MPCC/SDLC) 2652" printed in March 1978 by the Signetics Corporation, 811 East Arques Ave., Sunnyvale, Calif. 94086.

The LR2-2 register 66 and LR2-3 register 67 store signals from I bus 64 for controlling such operations as clear, idle link state, transmit-on, receive-on, and loop modes of USRT-2 88 and USRT-3 90 respectively.

An LR5 multiplexer 128 receives output status signals indicating transmit underrun, byte available, status available, and idle link state from USRT-2 88 or USRT-3 90 for transfer to I bus 64.

Intercept data programmable read only memory (PROM) 70 is addressed by channel number signals selecting a particular communication channel in communications subsystem 1 and also addressed by signals indicating that the USRT-2 88 or the USRT-3 90 has generated a data service request. An intercept signal from PROM 70 is applied to intercept control logic 80. Microprocessor 96 queries intercept control logic 80 for the interrupt signal. Microprocessor 96 is responsive to the intercept signal to receive the remaining PROM 70 signals identifying the interrupting unit for processing the particular communication channel.

A channel register 74 is associated with the paging operation which is described infra. Channel register 74 is loaded by microprocessor 96 through U bus 82, transceiver 98, and I bus 64 with information indicating which communication channel is operative. Signals CPGCNL+00 and CPGCNH+00 are provided to the strobe generator and control register 102 for generating FLAP strobes and storing the direct connect, clear to send and protocol modes of operation.

A random access memory (RAM) 118 stores channel control programs (CCP), communication control blocks (CCB) and line control tables (LCT). This information is loaded into RAM 118 from main memory 6, via system bus 2, transceiver 50, C bus 62, in data register 56, I bus 64, transceiver 98, U bus 82, a transceiver 108, and an M bus 110 to RAM 118. This is accomplished by microprocessor 96 generating appropriate address locations which are transferred to RAM 118 via address bus 100 and paging logic 116.

The communications controller 10 continually scans the communication lines from FLAPs 12, 14, 16 and 18 for any activity. Upon detection of a receive channel activity, the receive CCP for that channel is initiated. Under CCP control the communications controller 10 analyzes the assembled receive data byte, performs any required checks, updates the LCT status and CCB control progress and delivers the data byte to main memory 6. The CCP terminates after each completed transfer to main memory 4, or when interrupted by a higher priority channel.

The CCB area of RAM 118 provides information on each communication line in a transmit mode and each communication line in a receive mode. The information includes a main memory 6 address location of the next data byte to be stored or read. The information further includes a count of the number of bytes remaining for transfer between the communications controller 10 and main memory 6, and the final status of the communication line. The final status includes error information, data set status (e.g. modem 26), interrupt status, and whether the CCB program has been executed and the status is complete.

The LCT area of RAM 118 stores receive and transmit configuration, context and control information for each communication line. Included are firmware work locations, CCP work locations, receive transmit character length information, a CCP pointer, data byte storage, status information and interrupt level information.

A CCB active register 76 stores information indicating which of the four communication lines is active, and whether the communication line is in a receive or transmit mode. The output of the CCB active register 76 is available to the microprocessor 96 through the paging logic 116.

An S register 78 allows the microprocessor 96 to perform an indirect addressing function by storing an address in the S register 78. This address replaces an address stored in a PROM 126 address location.

PROM 126 stores the firmware routines which are operative with the microprocessor 96. Address information is sent from microprocessor 96 to PROM 126 via address bus 100 and paging logic 116. A microword read from PROM 126 is sent back to the microprocessor 96 via the M bus 110, transceiver 108 and U bus 82.

The microprocessor 96 communicates with the CPU 4 and the main memory 6 over system bus 2 as well as the USRT-2 88 and USRT-3 90 through the firmware routines stored in PROM 126 and the software channel program routines stored in RAM 118.

It is necessary to match the speed of microprocessor 96 with the speed of the logic and memory units. This is accomplished through a clock logic 94 unit. The microprocessor 96 normally runs at a 500 nanosecond or two megahertz clock rate. However, when the microprocessor 96 communicates with the USRT-2 88 and USRT-3 90 or FLAP 122a, 122b, 122c or 122d logic, the clock logic 94 phase 1 and phase 2 timing signals are slowed to a 1600 nanosecond or 0.625 megahertz clock rate. The clock logic 94 outputs a number of clock phase signals in each microprocessor 96 phase 1 and phase 2 cycles. The phase 1 and phase 2 cycles are stretched to enable additional clock phase signals to control the FLAP 122a-d logic.

When USRT-2 88 is in a transmit (bit oriented protocol) mode, and the next data byte is not provided to the USRT-2 88 in time to provide a continuous stream of bits to the receiving station, then a transmit underrun unit 92 conditions the USRT-2 88 to transmit a series of binary ONEs indicating to the receiving station that the message was aborted. The data bytes are sent to a device via serial FLAP interface logic 106 and a FLAP line interface 124c or 124d.

An idle link state unit 93 is also coupled to the USRT-2 88. When the USRT-2 88 is in a receive (bit oriented protocol) mode, the sending station places the line in an idle state by sending 15 binary ONE bits on the line. The idle link state unit 93 detects the 15 binary ONE bits and informs the microprocessor 96 that the line is in an idle link state via LR5 MUX 128. The microprocessor 96 responds to the 15 successive binary ONE bits to abort the message sent by the sending station and look for a new message.

A transmit underrun unit 85 and an idle link state unit 86 are coupled to USRT-3 90 to perform the transmit underrun operation and receive idle link state operation for that communication channel.

An address decode 114 unit receives address signals from the microprocessor 96 via address bus 100 and generates control signals which perform a number of functions, typically activating the stretch cycle of clock logic 94, enabling certain registers to store information from the various buses, enabling a strobe generator and control register logic 102 by means of signal CPGFLP-00, and enabling USRT-2 88 and USRT-3 90.

The strobe generator and control register logic 102 is responsive to address signals received over address bus 100 for generating separate strobe signals for FLAP registers 122a, 122b, 122c and 122d as well as control signals which are enabled at the respective FLAP registers 122a-d by the particular strobe signal. Stored are bits indicating the direct connect, clear to send and protocol modes of operation.

An external connector 84 is provided for testing purposes. It allows test equipment to be connected to U bus 82 to exercise the communications controller 10 through firmware test routines applied externally. PROM 126 may be disabled for certain test sequences.

A paging logic 116 unit in conjunction with the channel register 74 and the CCB active register 76 allows the microprocessor 96 to be operative with the eight communication channels using a single firmware set of routines. Associated with each communication channel is a block of CCB software. The paging logic allows the same set of firmware routines to process each CCB program. Similarly, the LCTs are organized by communication lines. The paging logic 116 allows a single firmware routine to be operative with each communication line.

Data is transferred between the U bus 82 and the FLAPs 122a-d via F bus 112 and a transceiver 104.

Figure 3:
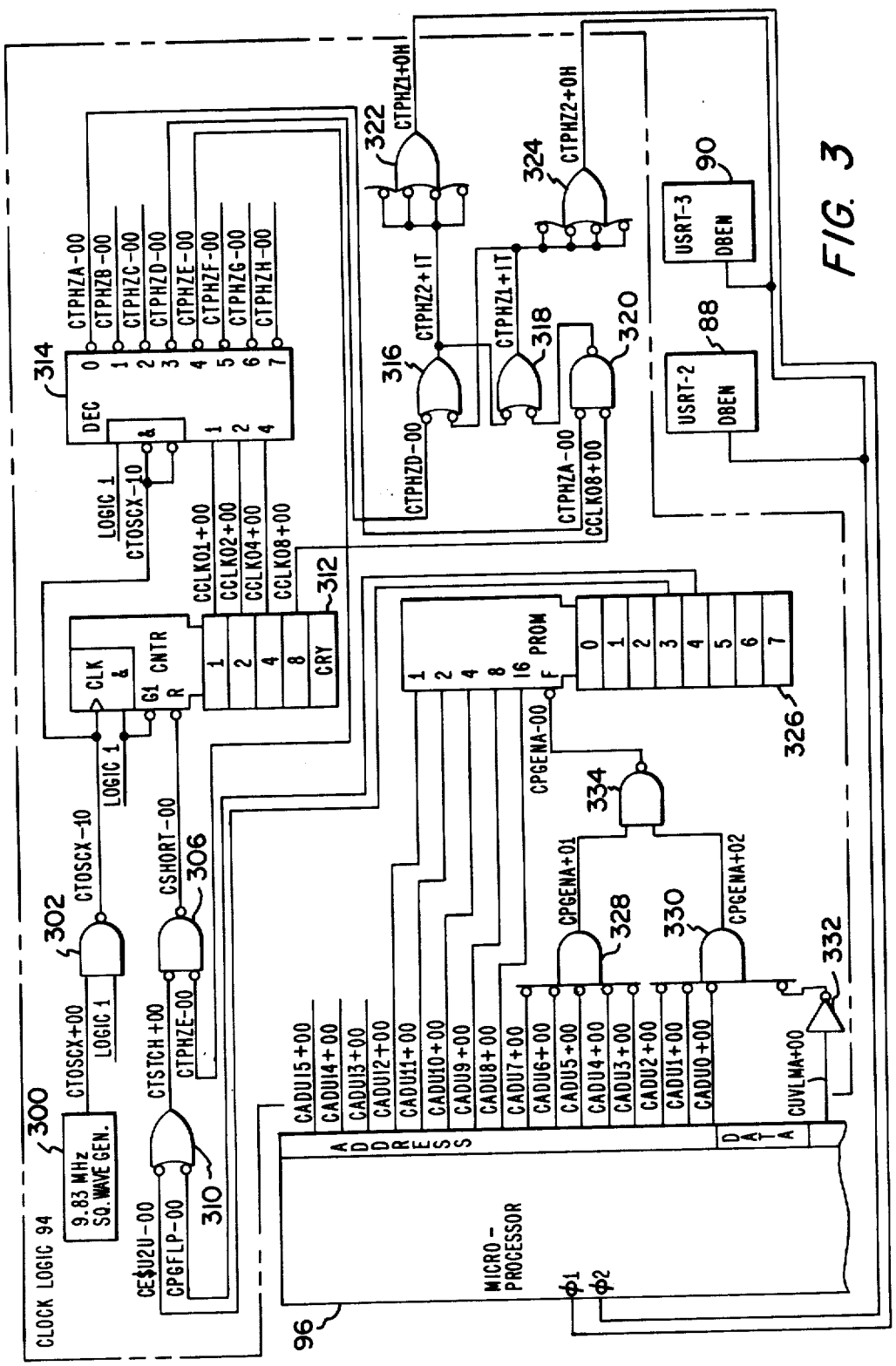
FIG. 3 shows the clock logic of the communications subsystem.

FIG. 3 shows the detailed clock logic 94. When the microprocessor 96 is operative with the USRT-2 88 or the USRT-3 90 and the FLAP 12, 14, 16 or 18, then the clock cycle is stretched from a 500 nanosecond cycle time to a 1600 nanosecond cycle time.

A 9.83 MHZ square wave generator 300 generates a square wave signal CTOSCX+00 which is inverted by a NAND gate 302. The output square wave signal CTOSCX-10 is applied to the clock terminal of a counter 312 and the enable terminal of a decoder 314. The counter 312 generates a binary count on output signals CCLK01+00, CCLK02+00 and CCLK04+00 which are applied to the 1, 2 and 4 input terminals of decoder 314. The negative going output clock phase signals CTPHZA-00 through CTPHZE-00 are generated in sequence. Clock phase signal CTPHZE-00 at logical ZERO applied to a negative AND gate 306 resets counter 312 via signal CSHORT-00 at logical ZERO and clock phase signal CTPHZA-00 if forced to logical ZERO on the next fall of square wave signal CTOSCX-10.

A programmable read only memory, (PROM0) 326, is addressed from the microprocessor by address signals CADU0-15+00 and valid memory address signal CUVLMA+00 through a NAND gate 328, a NAND gate 330, a NAND gate 334 and an inverter 332. Output signal CPGFLP-00 at logical ZERO indicates that the microprocessor 96 will communicate with the FLAPs 12, 14, 16 or 18. Output signal CE$U2U-00 at logical ZERO indicates that the microprocessor 96 will communicate with USRT-2 88 or USRT-3 90. Either signal, CPGFLP-00 or CE$U2U-00, at logical ZERO forces a NOR gate 310 output signal CTSTCH+00 to logical ONE thereby preventing counter 312 from resetting on the fifth count when clock phase signal CTPHZE-00 is forced to logical ZERO. Counter 312 then continues to count to binary 16 until both signals, CE$U2U-00 and CPGFLP-00 are at logical ONE.

Clock phase, signal CTPHZA-00 at logical ZERO is applied to a negative AND gate 320 which forces the output signal CTPHZ1+1T of a NOR gate 318 to logical ONE and the output signal CTPHZ2+1T of a NOR gate 316 to logical ZERO. Signal CTPHZ1+1T remains at logical ONE and signal CTPHZ2+1T remains at logical ZERO until clock phase signal CTPHZD-00 applied to NOR gate 316 is forced to logical ZERO. A NOR gate 322 and a NOR gate 324 generate the microprocessor 96 timing signals CTPHZ1+0H and CTPHZ2+0H by inverting signals CTPHZ1+1T and CTPHZ2+1T. The CTPHZ2+0H signal applied to USRT-2 88 and USRT-3 90 enables the data bus. Counter output signal CCLK08+00 applied to negative AND gate 320 suppresses the generation of the timing signals CTPHZ1+0H and CTPHZ2+0H during the stretch cycle operation when the counter 312 counts from binary 8 to binary 15.

Figure 4:
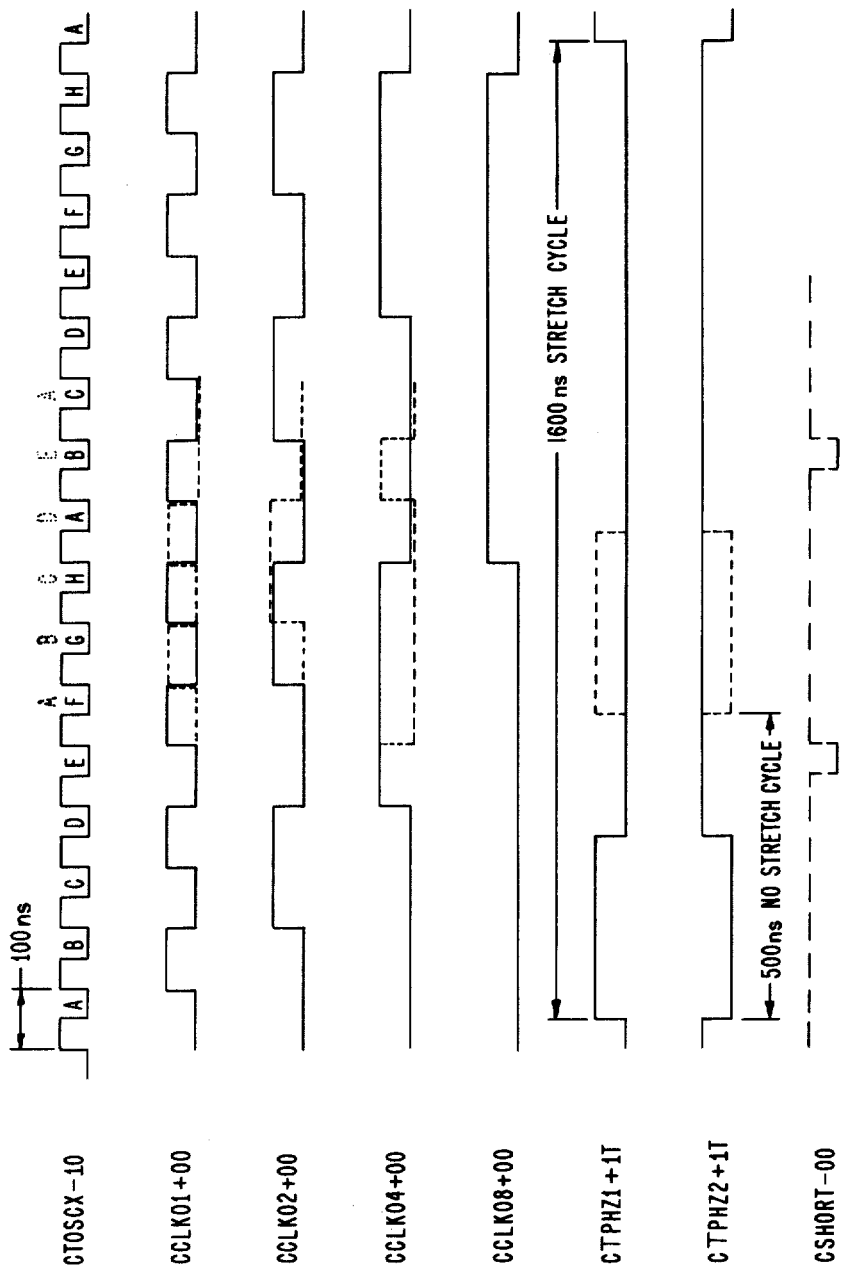
FIG. 4 is a timing diagram of the clocking signals.

FIG. 4 is a timing diagram showing the stretch cycle with solid lines and the no stretch cycle with dotted lines. The 100 nanosecond square wave signal CTOSCX-10 generates the clock phase signals for 50 nanoseconds, every 50 nanoseconds as the output of decoder 314. The binary output of counter 312, signals CCLK01, 02, 04 and 08+00 generate clock phase signals A through H during the stretch cycle and A through E during the no stretch cycle. The CTPHZ1+1T and CTPHZ2+1T are generated during the time that clock phase signals A and D go low.

Signal CSHORT-00, shown dotted, resets counter 312 at "E" time thereby initiating "A" time as the next cycle that signal CTOSCX-10 is low.

Counter 312 is a 74S163 circuit and decoder 314 is a 74S138 circuit described in "The TTL Data Book for Design Engineers", Second Edition 1976, published by Texas Instruments.

Having shown and described a preferred embodiment of the invention, those skilled in the art will realize that many variations and modifications may be made to affect the described invention and still be within the scope of the claimed invention. Thus, many of the elements will provide the same results and fall within the spirit of the claimed invention. It is the intention, therefore, to limit the invention only as indicated by the scope of the claims.

What is claimed is:

1. In combination with a communications subsystem comprising a controller bus, a communications controller coupled to said controller bus, a plurality of Flexible Line Adapters (FLAPs) coupled to said controller bus, a U bus coupled to said controller bus, at least on Universal Synchronous Receiver Transmitter device (USRT) coupled to said U bus for synchronously transmitting and receiving messages, a random access memory (RAM) coupled to said U bus for storing information and a microprocessor coupled to said U bus, said microprocessor operative to control said RAM at a first clock rate and also operative to control said USRT and said plurality of FLAPs at a second clock rate, clocking logic coupled to said U bus for supplying said first and second clock rates comprising:

(a) a binary counter for generating counter signals;

(b) a freerunning clock coupled to said binary counter for providing freerunning clock signals to advance said binary counter;

(c) a decoder coupled to said binary counter for decoding the counter signals;

(d) logic gates coupled to said decoder responsive to decoded counter signals for generating first and second phase timing signals; and (e) first means coupled to said microprocessor for indicating that one of said plurality of FLAPs or said USRT are operative with said microprocessor; and, (f) inhibiting means coupled to said decoder and said binary counter and responsive to one of the decoded counter signals for resetting said binary counter resulting in said first and said second phase timing signals being applied to said microprocessor at said first clock rate, said inhibiting means being further coupled to said first means and responsive to signals indicative of said microprocessor communicating with said USRT or said one of said plurality of FLAPs for preventing said binary counter from resetting, resulting in said clocking logic supplying said first and said second phase timing signals to said microprocessor at said second clock rate.

2. The apparatus as recited in claim 1 wherein said USRT is coupled to said logic means for receiving the second phase timing signals.

3. The apparatus as recited in claim 2 including a first NAND gate coupled to said binary counter and a square wave generator coupled to said first NAND gate for generating square wave signals which are inverted by said NAND gate.

4. The apparatus as recited in claim 3 wherein said inhibiting means comprise a negative AND gate and a NOR gate coupled to each other.

* * * * *